Aug. 26, 1969     G. O. BOEHM ETAL     3,463,571

TOTAL INTERNAL REFLECTION DEFLECTOR

Filed Oct. 1, 1965

INVENTORS
GILBERT O. BOEHM
HARRY S. HOFFMAN, JR.
JAMES H. WILLIAMS

BY *Earl C. Hancock*
ATTORNEY

United States Patent Office 3,463,571
Patented Aug. 26, 1969

3,463,571
TOTAL INTERNAL REFLECTION DEFLECTOR
Gilbert O. Boehm, Kingston, Harry S. Hoffman, Jr., Saugerties, and James H. Williams, Woodstock, N.Y., assignors to International Business Machines Corporation, Armonk, N.Y., a corporation of New York
Filed Oct. 1, 1965, Ser. No. 491,997
Int. Cl. G02f 1/24
U.S. Cl. 350—157          5 Claims

ABSTRACT OF THE DISCLOSURE

This invention relates to an optical apparatus for separating a single beam into two separate beams of light, the single beam of light containing two different polarities each being orthogonal to each other. A prism of birefringent material and an isotropic block having a mirror thereon are employed to separate the two co-mingled beams.

---

Figure 1:
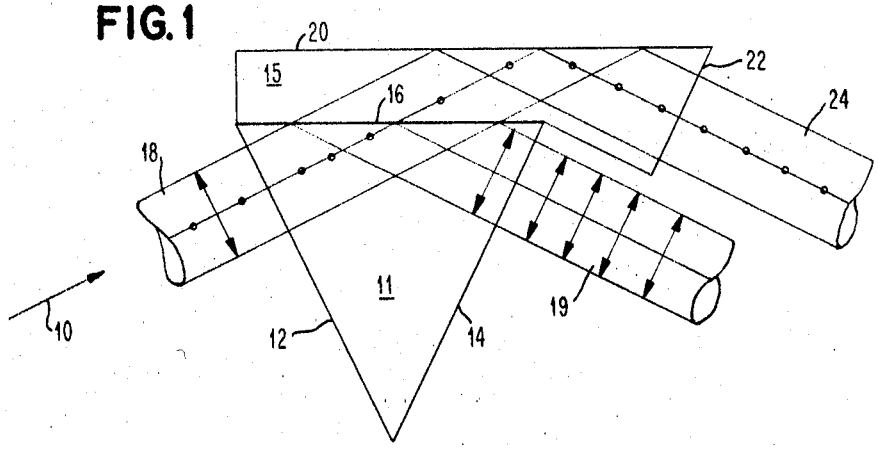

This invention relates to optical devices for selecting or separating light beams on the basis of polarization thereof. More particularly, this invention relates to devices for segregating the light generated from a source where the light is either of a first polarization or of a polarization orthogonal with respect thereto, this sometimes being referred to as the ordinary and extraordinary rays or beams. The present invention is particularly useful for binary separation or direction of light under electronic control.

There are now in existence devices for rotating a polarized light beam orthogonally under control of electronic circuitry. Such a device is disclosed in the article entitled "A Fast, Digital-Indexed Light Deflector" by W. Kulcke et al. at page 64 in the IBM Journal of Research and Development, volume 9, No. 1, January 1964 issue. There have also been known several arrangements for advantageously utilizing the ability to orthogonally rotate polarized light beams in order to control the destination of that beam. Thus, by utilizing birefringent material which exhibits a high index of refraction to polarized light having one orientation and a low index of refraction to polarized light having an orientation orthogonal or displaced by 90° with respect to the first mentioned orientation, it is possible to employ reflection for separation of such beams. Devices for this purpose are described in copending applications Ser. No. 469,148 by H. S. Hoffman, Jr. entitled "Non Parallel Surfaced Light Deflector-Selector" and Ser. No. 469,068 by Harry S. Hoffman, Jr. and James Lipp, entitled "Polarized Light Deflector-Selector," both of the aforementioned copending applications being assigned to the same assignee as the present application. The present invention advantageously utilizes the characteristics of the birefringent material to provide total separation of two light beams emanating from a common source and having orthogonal polarization.

Briefly, the present invention permits separation of light rays having orthogonal polarization in an arrangement wherein the optical path lengths travelled by each light beam passing through the device will be the same with respect to the output. To accomplish this, the present invention employs a prism of birefringent material which has an isosceles triangle cross-section with its optic axis perpendicular to the apices of that triangle. The prism accepts the light from a common source and at an internal surface totally reflects this light if it is of one polarization and allows it to pass through that surface if it is of the orthogonal polarization. This is accomplished by means of an isotropic layer contiguous to this internal surface of the prism and which has an index of refraction substantially matching the lower index of refraction of the birefringent material in the prism. The angle of incidence at the internal surface is arranged to be greater than critical for the high index permitting total internal reflection thereof while the angle of incidence for the lower index is less than critical so that passage thereof through this interface is permitted. The isotropic material has a surface defined therein which redirects the light passed through the second surface of the prism into a direction substantially parallel to the light totally reflected in the birefringent prism thereby providing a second output ray.

The path for a light ray is the product of the index of refraction of the material through which is passing times the actual distance travelled by the light ray in going through that material. Thus, path length compensation is realized within the present invention by constructing and arranging the isotropic plate so that, since it has the lower index of refraction, the product of its index of refraction times the distance of actual light travel from input to output is substantially the same as the sum of the indices of refraction times the actual distance travelled by the light totally reflected in the birefringement prism. By this arrangement, geometrical or physical path lengths required to totally separate two light beams or rays is considerably smaller than in the prior art.

The present invention can be modified to include a fluid material matching the common index of refraction between the isotropic material and the birefringement material. By using two orthogonal polarizations of input light, one parallel to and one perpendicular to the optic axis, with a normal incidence of the input face, a complete selection can be made. In passing through the boundary with no index change, there would be no appreciable reflection and hence no noise or undesired reflection. The critical angle referred to is determined by the relative index between the isotropic material and the high index of the birefringent material. The longest geometric path has the lowest index of refraction thus making it possible to match the optical path lengths of the two selections by choosing the angle of incidence such that the ratio of geometric paths is the inverse of the relative index. Thus, proper choice of geometry provides a self-compensated deflector as far as the apparent path length of light travel is concerned. Accordingly, it can be seen that focusing of one light beam path will be tantamount to focusing for the other paths so that an output beam at one output face will appear substantially the same in quality as at the other face. While the two outputs of the present invention must be discrete, large deflections are possible with short optic path lengths. This provides a large numeric aperture with relatively small aperture thereby reducing the required area of the electro-optic rotator preceeding the deflector stage.

It should be noted that the present description is presented in terms of separation of light beams on the basis of polarization from a common light source. However, it will be appreciated that the present disclosure is equally as applicable to the recombining of light based upon polarization by simply reversing the operation described herein.

Accordingly, it is an object of the present invention to provide a polarized light separator having path length compensation for the light so separated.

It is another object of this invention to provide a means for separating polarized light advantageously utilizing the characteristics of total reflection associated with birefringent material.

It is still another object of the present invention to employ the characteristics of both birefringent and isotropic material to accomplish polarized light separation.

It is yet another object of the present invention to provide segregation of polarized light based upon the orientation of the polarization.

A still further object of the present invention is to permit switching of a light beam from a common source to a selected output appearance in a manner that is readily adaptable to control by electronic circuitry.

Another object of this invention is to permit separation of light from a common source with the output light being totally separated.

Still another object of the present invention is to provide a relatively large separation of optical signals with a large numeric aperture but with a relatively small physical aperture.

Figure 2:
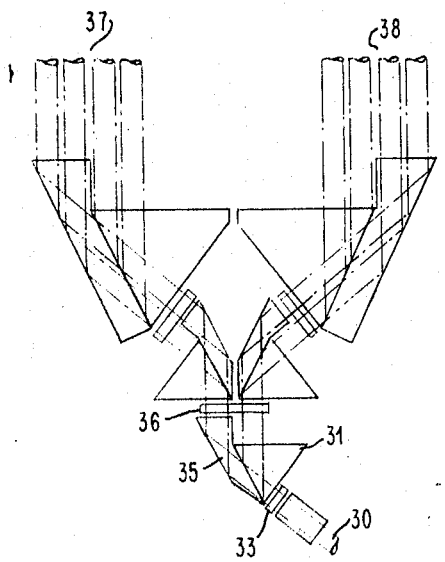
Figure 3:
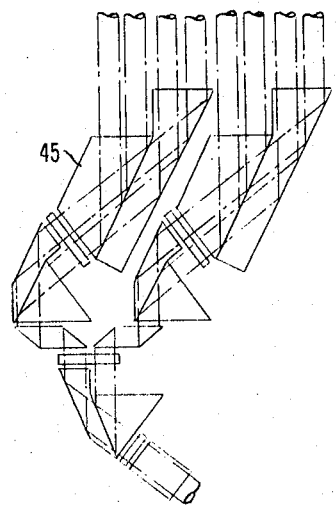

The foregoing and other objects, features and advantages of the present invention will be apparent from the following more particular description of the preferred embodiment of the invention as illustrated in the accompanying drawings in which:

FIGURE 1 is a representation of a preferred embodiment of the present invention, FIGURE 2 is an illustration of how the structure in accordance with FIGURE 1 can be combined to permit separation of polarized light from a common source into two sets of output beams, and FIGURE 3 is another illustration of how a single source of polarized light can be separated into any one of a plurality of output beams which are shown in tandem.

By means not shown, polarized light which may be rotated orthogonally is produced at source 10 for an input to the present invention, one polarization orientation being represented by small dots or circles while the other polarization orientation is illustrated by the double headed arrows. Source 10 could be composed of any polarizer and electro-optic switch such as the KDP crystal rotator shown by Kulcke et al. in the IBM Journal article mentioned hereinbefore.

The FIG. 1 embodiment of this invention includes a prism 11 composed of negative uniaxial birefringent material having a lower index of refraction N1 and a higher index of refraction N2. A typical birefringent material for prism 11 could be sodium nitrate. Prism 11 is preferably constructed in an isosceles triangle cross-section with the planes of input surface 12 and output surface 14 being equal in length. The optic axis of prism 11 is perpendicular to the plane of the drawing and parallel to the apices of the prism.

Plate 15 also shown in cross-section or end view in FIG. 1 is constructed of an isotropic material having an index of refraction substantially matching the lower index of refraction N1 of prism 11. The lower surface of plate 15 is arranged contiguous to the upper surface of prism 11 thereby forming an interface 16 therebetween. A typical material available for plate 15 is sodium flouride.

Face 12 would preferably be cut so that incident ray or beam 18 would be normal thereto to minimize undesired reflection. Input beam 18 after entering at face 12 would impinge upon interface 16 at an angle of incidence greater than critical for the higher index of refraction N2 for prism 11 thereby causing the portion of beam 18 that is polarized perpendicular to the optic axis of prism 11 to be totally reflected from interface 16 into beam 19. Beam 19 is normal to surface 14 and thus passes through to become one of the output beams. At the same time, the angle of incidence of input beam 18 on interface 16 is less than critical for the lower index of refraction N1 of prism 11 and thus the portion of beam 18 polarized parallel to the optic axis of prism 11 will pass through interface 16 without being reflected and enter plate 15.

A second surface 20 of plate 15 receives the beam passed by interface 16 and is adapted to redirect this beam toward output surface 22 where it becomes output beam 24. The surface 20 reflection could be accomplished by a coating that produced specular reflection or surface 20 could have material having an index of refraction lower than N1 contiguous thereto to cause total internal reflection at this surface. It should be noted that output face 22 is shown as receiving the beam reflected from surface 20 normal thereto but, if it should be desired to correct for refraction distortion, the angle of face 22 can be adjusted. Intimate contact of the prism 11 and plate 15 can be facilitated by filling the space between 11 and 15 which defines interface 16 with a thin layer of liquid that has an index of refraction matching that of plate 15. Further, slight deflections of surface 20 can also correct for minor errors in direction. It should be also recognized that plate 15 could be a liquid isotropic material with surface 22 being an adjustably mounted thin plate.

A device constructed in accordance with this invention will be self-compensated if the optical path length for both output beams is maintained approximately equal. To be more specific, the product of N1 and the physical distance travelled by the light from input surface 12 to output surface 22 should be generally equal to the sum of N2 times the distance the light travels from face 12 to face 14 and the index of the medium surrounding 14 times the distance from face 14 to a point on output beam 19 cut by the plane of face 22. Thus because the longest geometric path has the lowest index of refraction, it is possible to match the optical path lengths of the two selections by choosing the angle of incidence such that the ratio of geometric paths is the inverse of the relative index. The angle of incidence required for compensation is sufficiently greater than the critical angle so that rays used in imaging which still qualify as paraxial rays will be correctly deflected.

The use of negative uniaxial birefringent material for prism 11 permits the reflection of the ordinary ray and the passage therethrough of the extraordinary ray. This avoids the problem of splitting of the e ray in the splitting angle effect. It is anticipated that for many applications the noise due to undesired reflection will be negligible so that variations in transmission between the two reflections will also be negligible. The two output beams 19 and 24 are discrete with a large deflection or separation with relatively short optic path lengths. This provides a large numeric aperture which provides greater image resolution. This large numeric aperture with a relatively small actual aperture also reduces the required area of the electro-optic rotator preceding the present invention.

Surfaces 12 and 14 would be surrounded by a medium having an index of refraction somewhere between N1 and N2. This would minimize any refraction distortion introduced at the input and output surfaces.

FIGURE 2 illustrates an arrangement for advantageously utilizing a plurality of devices in accordance with this invention for electronic deflection of light from a common source 30. The polarized light at 30 passes through a rotator at 33 which causes beam switching by rotating the polarity of the light. That is, this beam can be totally reflected either in prism 31 or in plate 35, these components operating in accordance with the FIG. 1 counterpart. A second rotator 36 then determines which direction the outputs of 31 and 35 will be deflected also by polarization rotation. This rotating and deflecting operation could continue until the light originating source 30 appears at any one of the output beams which are formed into separate groups 37 and 38. By use of the present invention as a basic component of this system, the quality of light appearing at any output beam of either group 37 or 38 will be substantially the same. Thus one common focusing function is possible.

FIG. 3 is quite similar to FIG. 2 except the components are arranged to produce one sequence of output beams. In addition, it should be noted that the final birefringent prisms, such as at 45, are of truncated cross-section or end view as it could have been in the other embodiments. It should be recognized that, in addition to the reversed operation combining a plurality of beams into a single beam as was mentioned hereinbefore, the present invention can be utilized to produce two output beams simultaneously from a single polarized input beam by orienting the input beam 45° relative to the orientations discussed hereinbefore.

While the invention has been particularly shown and described with reference to a preferred embodiment thereof, it will be understood by those skilled in the art that changes in form and detail may be made therein without departing from the spirit and scope of the invention.

What is claimed is:

1. A polarized light deflector comprising
   a source for selectably producing polarized light,
   a prism of birefringent material having at least two apices and an optic axis parallel to each of said apices for accepting the light from said source through a first surface thereof defined by a plane containing one of said apices, the light from said source enters said first surface at an angle substantially normal to said first surface,
   isotropic means arranged contiguous to a second surface of said prism and having an index of refraction substantially the same as the lower index of refraction of said prism, the light from said source passing through said second surface when of one polarization and being totally reflected from said second surface through a third surface of said prism when of a second polarization orthogonal with respect to said first polarization, and
   means associated with said isotropic means for redirecting the light passing through said second surface into a path in the same direction and parallel to the light passing through said third surface.

2. Apparatus in accordance with claim 1 wherein said isotropic means and said second surface have the space thereinbetween filled with a liquid having an index of refraction substantially matching that of said isotropic means.

3. Apparatus in accordance with claim 1 wherein said isotropic means is constructed and arranged for causing said redirected light to travel an optical path substantially the same as the optical path followed by light reflected at said second surface.

4. A polarized light deflector comprising
   a source for selectably producing polarized light,
   a prism of birefringent material having at least two apices and an optic axis parallel to each of said apices for accepting the light from said source through a first surface thereof defined by a plane containing one of said apices, the light from said source enters said first surface at an angle substantially normal to said first surface,
   a plate of isotropic material having an index of refraction substantially the same as the lower index of refraction of said prism and being arranged so that a first surface thereof forms a contiguous interface with a second surface of said prism, said interface being arranged for passing therethrough light from said source when of a first polarization and for totally reflecting said light back into said prism and through a third surface thereof when said light is of a polarization orthogonal with respect to said first polarization,
   means associated with a second surface of said plate for redirecting the light passing through said interface into a path in the same direction and parallel to the light passing through said third surface of said prism, said plate being constructed and arranged for producing said redirected light as an output at a third surface of said plate after said redirected light has traversed an optical path substantially equal to the optical path traversed by the light reflected by said interface.

5. Apparatus in accordance with claim 4 wherein said interface between said prism and said path is filled with a liquid having an index of refraction substantially matching that of said plate.

References Cited

UNITED STATES PATENTS

| | | | |
|---|---|---|---|
| 2,447,828 | 8/1948 | West | 350—157 |
| 2,449,287 | 9/1948 | Flood | 350—157 |
| 2,601,175 | 6/1952 | Smith | 350—157 |

FOREIGN PATENTS 918,102   1/1947   France.

OTHER REFERENCES

Fleischer et al.: "Digital Indexed Angular Light Deflector System," I.B.M. Tech. Disc Bulletin, vol. 6, No. 5, October 1963, pp. 32–34.

DAVID SCHONBERG, Primary Examiner

PAUL R. GILLIAM, Assistant Examiner